United States Patent [19]

Brilli

[11] E Re. 30,672

[45] Reissued Jul. 14, 1981

[54] METHOD FOR FORMING INSERTS IN SHOE SOLES AND THE PRODUCT OBTAINED

[76] Inventor: Fosco Brilli, Via Ruscomi, 44, 20027 Milan, Italy

[21] Appl. No.: 11,641

[22] Filed: Feb. 12, 1979

Related U.S. Patent Documents

Reissue of:

[64] Patent No.: 4,024,652
Issued: May 24, 1977
Appl. No.: 572,626
Filed: Apr. 28, 1975

[30] Foreign Application Priority Data

Apr. 30, 1974 [IT] Italy ..... 22108/74

[51] Int. Cl.[3] ..... A43C 13/08; A43D 9/00; A43D 65/00

[52] U.S. Cl. ..... 36/14; 12/142 RS; 264/244

[58] Field of Search ..... 36/32 R, 4, 14; 12/142 RS, 142 T, 146 BR; 264/244; 425/119

[56] References Cited

U.S. PATENT DOCUMENTS

| | | | |
|---|---|---|---|
| 3,806,974 | 4/1974 | DiPaolo | 12/142 RS |
| 3,855,657 | 12/1974 | Mazzotta | 12/142 RS |
| 3,949,040 | 4/1976 | Drab | 264/244 |
| 4,024,652 | 5/1977 | Brilli | 36/14 |

*Primary Examiner*—Patrick D. Lawson
*Attorney, Agent, or Firm*—Bacon & Thomas

[57] ABSTRACT

A method for the formation of inserts in the edge of footwear or shoe soles made by means of injected plastic material, in which either the edge of the sole or the whole sole of the footwear is first moulded by injection, and successively at least a lateral recess is obtained in said edge of the sole itself, and thereafter a differently colored plastic material is injected into said recess for forming a lateral insert in the previously moulded edge of the footwear sole.

9 Claims, 5 Drawing Figures

METHOD FOR FORMING INSERTS IN SHOE SOLES AND THE PRODUCT OBTAINED

Matter enclosed in heavy brackets [ ] appears in the original patent but forms no part of this reissue specification; matter printed in italics indicates the additions made by reissue.

The present invention refers to a method to make coloured inserts on the edge of soles for footwears or shoes, the plastic material sole of which, is obtained, for example, either by a direct injection into the upper, or by a separate injection subsequently applied to the upper itself.

Among the many examples let us consider the case of tennis shoes. It is known, for instance, that for tennis shoes or sport shoes in general - wherein the edge and the bottom of the sole are formed with moulded plastic material, decorative patterns or garnishes are laterally applied to the edge, said garnishes being of a different colour from that of the edge material, and reproducing symbols or shoe-factory trade marks; said garnishes are directly glued or vulcanized on the moulded edge of the shoe.

The scope of this invention is to provide a method and a mould to form inserts on the edge of shoe soles, through a direct moulding; thus avoiding sequential operations and the use of a further labour for the application of the usual marks, as said above.

In order to make differently coloured inserts of a footwear sole with injected plastic material, the method of the present invention generally foresees a shoe sole made by injection into a mould, obtaining at least a lateral recess in the edge of the sole itself, and subsequently a differently coloured plastic material is injected into said recess to form a lateral insert on the edge of the previously made shoe.

For the scopes of the present invention it is to be considered that those parts of plastic material partially covering some top portions of the upper-like the toe-end of basket shoes are a part of the sole edge itself, consisting of an extension of this latter. Therefore according to this method, inserts of coloured plastic material can be obtained also in said parts.

Soles are used having either the same colour or a different colour of the bottom; therefore, said insert can be injected either utilizing the material of the sole bottom, if it is of a different colour, or it can be injected separately and made with a material different from that one of the sole itself.

Besides being aimed to a footwear obtained by the said method, this invention also refers to a modified mould to form the shoe-sole having an insert of injected plastic material wherein said mould foresees, correspondingly with the edge of the sole, a lateral movable piece, which is pushed forward during the injection of the edge or of the whole sole of the shoe, in order to obtain a recess at the location where the insert is formed, said movable piece being successively caused to retract of a predetermined extent to allow the injection of said insert, so that this latter will be firmly joined to the edge or to the sole previously injected.

Said movable piece can be deplaced in any suitable way, however better if automatically, for example by means of pneumatic, hydraulic or mechanic systems, which utilize the movement of the mould movable parts.

The invention will be better-described hereafter, with some not limitative examples of the invention itself.

Figure 1:
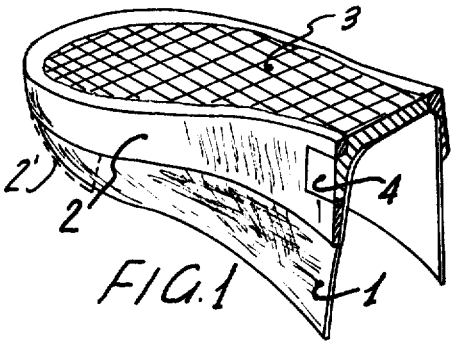
FIG. 1 is a perspective view of the overturned half-front part of a footwear wherein the insert has been obtained, according to the invention with the same material of the bottom of the sole.

In FIG. 1, the fore part of a general footwear is shown, comprising an upper 1 whereupon a lateral edge and a bottom 3 of the shoe sole is formed, both being obtained by injection of plastic material into a mould.

The edge 2 of the sole has an insert 4 of a material different or differently coloured from that of the edge 2 itself.

In the case of FIG. 1, the insert 4 is obtained contemporaneously and with the same material of the bottom 3 of the sole with edge 2 surrounding all sides of insert 4. However an insert, such as a pattern or a decorative design, a wording or the like, might also be made on the covering wall 2' of the toe-shoe and which constitutes an extension of the edge 2 of the sole.

Figure 2:
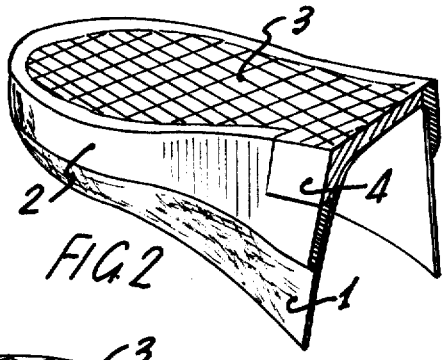
FIG. 2 is a view similar to FIG. 1 showing a first variant with the insert obtained with the same material of the sole.

FIG. 2 differs from FIG. 1 only because the insert 4, always obtained by the same material of the bottom of the injected sole 3, is only partially surrounded by the material on the edge 3 of the sole, confining or continuing with bottom 3; the remaining part is obtained in a completely identical way of the previous one.

Figure 3:
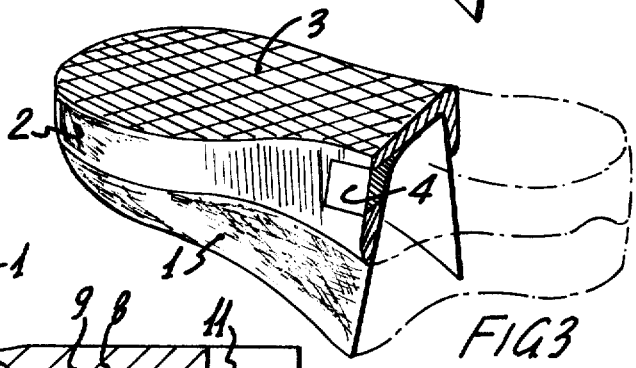
FIG. 3 represents a view similar to FIG. 1 showing another variant, wherein the insert is obtained separately.

In FIG. 3 there is a further variant, wherein the edge 2 and bottom 3 of the sole are made by the same injected material, while insert 4 is made sequentially, by a second injection, and separately by a different or differently coloured material.

From what precedes, it will be understood that according to the method of the present invention, in order to obtain an insert injected into the lateral edge of a sole, it is foreseen before the formation of the edge or of the whole sole of the footwear itself by injection, to obtain first at least a lateral recess, in the moulded edge, and successively to inject a different coloured plastic material in said obtained recess, thus getting a lateral insert in the edge of the said sole. The insert 4 can be either injected simultaneously and made with the same material of the bottom of the sole, or it can be formed or injected separately and subsequently as in the case of FIG. 3.

It is clear that what is described and shown with reference to FIGS. 1 to 3 is only given as an illustrative example, and other solutions according to the need can be adopted; for instance, one or several coloured inserts can be also made on the same one edge of a sole, in positions different from each other.

Figure 5:
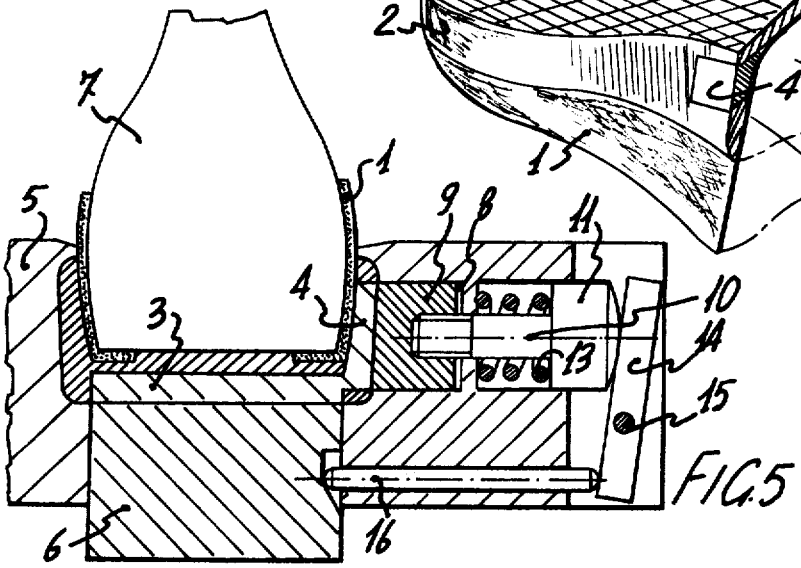
FIGS. 4 and 5 are two cross-sections of a mould in two different working positions, for obtaining the formation of an insert according to FIG. 1.
Figure 4:
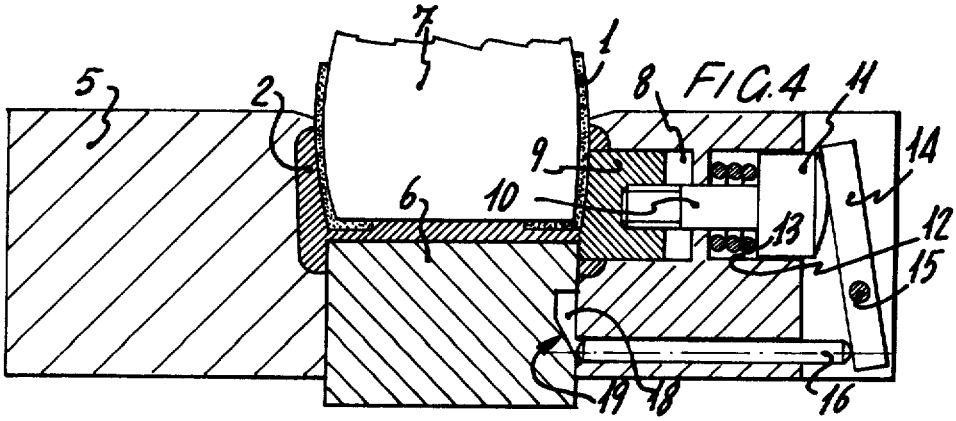

With reference to FIGS. 4 and 5, we are going to describe, in detail, a method and a mould to obtain the formation of the insert according to FIG. 1.

As it is seen in FIG. 4, the mould for injecting the edge and the bottom of a footwear sole, substantially comprises: a first stationary ring-shaped portion 5, on the inner surface of which the shape of border 2 of the sole is obtained as well as a second movable portion or insole 6, which can be deplaced perpendicularly to the plane of ring 5, thus allowing either the contemporary or subsequent formation of the bottom 3 of the sole. Moreover, numeral 7 refers to a higher form which keeps the upper 1 of the footwear and complete the closing of the mould.

It can be noted on FIG. 4 of the annexed drawings, that a recess 8 has been obtained in ring 5 of the mould correspondingly to the location, in which the insert 4 is to be formed, said recess 8 being open on the inner side of ring 5 of the mould.

A sliding piece 9 is located in recess 8; said piece can be deplaced from its completely forward position of FIG. 4 to the completely retracted position of FIG. 5. The sliding of the piece 9 can be realized in various ways, for instance by connecting it to the pneumatic cylinder or by mechanic devices, or, as in the represented example, utilizing the movement of the portion 6 of the mould.

In fact in FIG. 4, the piece 9 is provided with a threaded hole on its outer side, where the end of a screw 10 is screwed up, whose head 11 laterally protrudes from the mould and can slide in a recess 12 formed in the ring 5 of the mould itself. Between the bottom of recess 12 and the head 11 of the screw, there is interposed a spring 13 which substantially acts to push head 11 to outwards and consequently to move piece 9 to its retracted position, shown in FIG. 5.

The outer end of the head 11 is slightly rounded and a lever 14 connected by fulcrum 15 to the mould structure.

Said lever acts, on its turn, on the outer end of a stem 16 which is driven sliding in a recess of ring 5 of the mould, said recess being laterally formed and arranged under piece 9.

The other end of stem 16 leans against the lateral surface of the movable portion or insole 6 of the mould, inserting in, or disinserting from, a recess 18 laterally formed in the insoil movable portion 6 and showing a driving surface 19 bent downwards.

Therefore when the insole 6 is lifted to the position of FIG. 4, the stem 16 leans against the outer surface of said insole 6, externally to recess 18, so that lever 14 is caused to rotate in a counterclockwise direction and pushes—by screw 10—the piece 9 to its fore position.

In this mould condition, the edge 2 of the sole is injected in the known way and there is the simultaneous formation, in the edge itself, of a cavity, wherein a differently coloured insert will be sequentially injected. Once that the lateral edge 2 of the sole is injected, the insole 6 is lowered so that the inner end of stem 16 enters the recess 18, thus freeing the lever 14 and allowing the spring 13, previously loaded, to act on the screw head 11 to cause the piece 9 to retract to its position illustrated in FIG. 5.

In such a case, the piece 9 frees the recess 2 previously formed in edge 2; thus bottom 3 of the sole can be injected and insert 4 can be simultaneously injected in the previously obtained recess of border 2.

It is clear that what has been described and shown in FIGS. 4 and 5 of the here annexed drawing, is only given as a non limitating example and that the idea of general solution consists in having a laterally movable piece in the mould in correspondence of the notched surface or the recess ready to be injected, formed in the edge of the sole, thus allowing the formation of a coloured insert according to the above described method.

I claim:

1. In a process for producing footwear having an upper and a plastic sole attached thereto by injection moulding, the sole comprising an edge portion and a bottom portion differing in colour with part of one of said portions extending into the other of said portion to form a differently coloured insert therein comprising the steps of:

a. Providing an open topped injection mold having its top closed by said upper and having its inner periphery comforming to the outer periphery of said sole, b. Providing a movable member in the side walls of said mold having an inner [service] *surface* thereof conforming to a portion of the outer periphery of the edge of said sole, said member being movable to an extended position within said mold and to a retracted position with its inner surface conforming to the adjacent inner surface of the inside wall of said mold, c. Injecting a first sole forming plastic material into said mold with said movable member in one of said positions to partially fill said mold, d. Moving said movable member to the other of said positions, and e. Injecting a second sole-forming plastic having a different colour from said first sole-forming plastic to fill said mold and complete the formation of said sole and provide two different colours of plastic in the edge of said sole with portions of one of said sole-forming plastic extending into the other of said sole-forming plastic to provide a coloured insert therein.

2. A method according to claim 1, characterized in that the insert is injected at the same time as the bottom of the sole and is formed by the same material of said bottom.

3. An article of footwear having an upper and a plastic sole attached thereto by injection molding, the sole comprising an edge portion and a bottom portion differing in colour with part of one of said portions extending into the other of said portions to form a differently coloured insert therein, said sole being attached by the steps of:

a. Providing an open-topped injection mold having its top closed by said upper and having its inner periphery conforming to the outer periphery of said sole, b. Providing a movable member in the side walls of said mold having an inner surface thereof conforming to a portion of the outer periphery of the edge of said sole, said member being movable to an extended position within said mold and to a retracted position with its inner surface conforming to the adjacent inner surface of the side walls of said mold, c. Injecting a first sole-forming plastic material into said mold with said movable member in one of said positions to partially fill said mold, d. Moving said movable member to the other of said positions, and e. Injecting a second sole-forming plastic having a different colour from said first sole-forming plastic to fill said mold and complete the formation of said sole and provide two different colours of plastic in the side of said sole, with portions of one of said sole-forming plastic extending into the other of said sole-forming plastic to form an insert therein.

4. In a process for producing footwear having an upper and a plastic sole attached thereto by injection molding, the sole comprising an edge portion and a bottom portion differing in colour, with part of one of said portions extending into the other of said portions to form a differently coloured insert therein, comprising the steps of:

a. Providing an open topped injection mold having its top closed by said upper and having its inner periphery conforming to the outer periphery of said sole, b. Providing a movable member in the side walls of said mold having an inner surface thereof conforming to a portion of the outer periphery of the edge of said sole, said member being movable to an extended position within said mold and to a retracted position with its inner surface conforming to the adjacent inner surface of the inside walls of said mold, c. Providing a movable member in at least a portion of the bottom wall of said mold, having an inner surface thereof conforming to at least a portion of the outer periphery of the bottom of said sole, said member being movable to an extended position within said mold and to a retracted position with its inner surface conforming to the adjacent inner surface of the inside wall of said mold, d. Injecting a first sole-forming plastic material into said mold with both of said movable members in their extended position to partially fill said mold, e. Withdrawing each of said movable members to their retracted position, and f. Injecting a second sole-forming plastic having a different colour from said first sole-forming plastic to fill said mold and complete the formation of said sole and provide two different colours of plastic in the edge of said sole with portions of one of said sole-forming plastics extending into the other of said sole-forming plastics to form an insert therein.

5. An article of footwear having an upper and a plastic sole attached thereto by injection molding, the sole comprising an edge portion and a bottom portion differing in colour with part of one of said portions extending into the other of said portions to form a differently coloured insert therein, said sole being attached by the steps of:

a. Providing an open topped injection mold having its top closed by said upper and having its inner periphery conforming to the outer periphery of said sole, b. Providing a movable member in the walls of said mold having an inner surface conforming to a portion of the outer periphery of the edge of said sole, said member being movable to an extended position within said mold and to a retracted position with its inner surface conforming to the adjacent inner surface of the side walls of said mold, c. Providing a movable member in at least a portion of the bottom wall of said mold having a inner surface thereof conforming to at least a portion of the outer periphery of the bottom of said sole, said member being movable to an extended position within said mold and to a retracted position with its inner surface conforming to the adjacent inner surface of the inside wall of said mold, d. Injecting a first sole-forming plastic material into said mold with both of said movable members in their extended position to partially fill said mold, e. Withdrawing each of said movable members to their retracted position, and f. Injecting a second sole-forming plastic having a different colour from said first sole-forming plastic to fill said mold and complete the formation of said sole and provide two different colours of plastic in the edge of said sole with portions of one of said sole-forming plastics extending into the other of said sole-forming plastic to form an insert therein.

*6. In a process for producing a plastic sole by injection moulding, the sole comprising an edge portion and a bottom portion differing in colour with part of one of said portions extending into the other of said portion to form a differently coloured insert therein comprising the steps of:*

*a. providing an injection mold having an inner periphery conforming to the outer periphery of said sole,*

*b. providing a movable member in the side walls of said mold having an inner surface thereof conforming to a portion of the outer periphery of the edge of said sole, said member being movable to an extended position within said mold and to a retracted position with its inner surface conforming to the adjacent inner surface of the inside walls of said mold,*

*c. injecting a first sole forming plastic material into said mold with said movable member in one of said portions to partially fill said mold,*

*d. moving said movable member to the other of said positions, and*

*e. injecting a second sole-forming plastic having a different colour from said first sole-forming plastic to fill said mold and complete the formation of said sole and provide two different colours of plastic in the edge of said sole with portions of one of said sole-forming plastic extending into the other of said sole-forming plastic to provide a coloured insert therein.*

*7. A method according to claim 6 characterized in that the insert is injected of the same material of said bottom.*

*8. In a process for producing a plastic sole by injection molding, the sole comprising an edge portion and a bottom portion differing in colour, with part of one of said portions extending into the other of said portions to form a differently coloured insert therein, comprising the steps of:*

*a. providing an injection mold having an inner periphery conforming to the outer periphery of said sole,*

*b. providing a movable member in the side walls of said mold having an inner surface thereof conforming to a portion of the outer periphery of the edge of said sole, said member being movable to an extended position within said mold and to a retracted position with its inner surface conforming to the adjacent inner surface of the inside walls of said mold,*

*c. providing a movable member in at least a portion of the bottom wall of said mold, having an inner surface thereof conforming to at least a portion of the outer periphery of the bottom of said sole, said member being movable to an extended position within said mold and to a retracted position with its inner surface conforming to the adjacent inner surface of the inside wall of said mold,*

*d. injecting a first sole-forming plastic material into said mold with both of said movable members in their extended position to partially fill said mold,*

*e. withdrawing each of said movable members to their retracted position, and*

*f. injecting a second sole-forming plastic having a different colour from said first sole-forming plastic to fill said mold and complete the formation of said sole and provide two different colours of plastic in the edge of*

*said sole with portions of one of said sole-forming plastics extending into the other of said sole-forming plastics to form an insert therein.*

*9. A sole comprising an edge portion and a bottom portion differing in colour with part of one of said portions extending into the other of said portions to form a differently coloured insert therein, said sole being by the steps of:*

*a. providing an injection mold having an inner periphery conforming to the outer periphery of said sole,*

*b. providing a movable member in the walls of said mold having an inner surface conforming to a portion of the outer periphery of the edge of said sole, said member being movable to an extended position within said mold and to a retracted position with its inner surface conforming to the adjacent inner surface of the side walls of said mold,*

*c. providing a movable member in at least a portion of the bottom wall of said mold having an inner surface thereof conforming to at least a portion of the outer*

*periphery of the bottom of said sole, said member being movable to an extended position within said mold and to a retracted position with its inner surface conforming to the adjacent inner surface of the inside wall of said mold,*

*d. injecting a first sole-forming plastic material into said mold with both of said movable members in their extended position to partially fill said mold,*

*e. withdrawing each of said movable members to their retracted position, and*

*f. injecting a second sole-forming plastic having a different colour from said first sole-forming plastic to fill said mold and complete the formation of said sole and provide two different colours of plastic in the edge of said sole with portions of one of said sole-forming plastics extending into the other of said sole-forming plastic to form an insert therein.*

* * * * *